United States Patent [19]

Neumann et al.

[11] 3,954,943

[45] May 4, 1976

[54] SYNTHESIS OF HYDROUS MAGNESIUM SILICATES

[75] Inventors: Barbara Susan Neumann, Redhill; Keith Geoffrey Sansom, Newport Pagnell, both of England

[73] Assignee: Laporte Industries Limited, Luton, England

[22] Filed: Dec. 6, 1973

[21] Appl. No.: 422,247

[30] Foreign Application Priority Data

Dec. 28, 1972 United Kingdom............... 59784/72

[52] U.S. Cl. .................................. 423/331; 106/71; 252/317; 423/158; 423/326
[51] Int. Cl.² .................... C01B 33/24; C01B 33/32
[58] Field of Search ........... 423/155, 158, 326, 331, 423/332, 333; 106/71

[56] References Cited

UNITED STATES PATENTS

| | | | |
|---|---|---|---|
| 1,254,230 | 1/1918 | Jackson | 423/155 |
| 1,756,786 | 4/1930 | Goldschmidt | 423/331 |
| 3,586,478 | 6/1971 | Neumann | 423/331 |
| 3,666,407 | 5/1972 | Orlemann | 423/331 |
| 3,671,190 | 6/1972 | Neumann | 106/71 |

*Primary Examiner*—Oscar R. Vertiz
*Assistant Examiner*—Gary P. Straub
*Attorney, Agent, or Firm*—Beveridge, DeGrandi, Kline & Lunsford

[57] ABSTRACT

Hydrous magnesium silicates having a crystal structure similar to that of natural hectorite may be prepared utilising as starting material a novel intermediate which may be prepared from talc. The novel intermediate, "mesotalc" is the product obtained by heating a mixture of talc and sodium carbonate so as to modify the talc structure while controlling the heating to avoid destroying it.

The "mesotalc" may be utilised in the production of hydrous magnesium silicates by forming an aqueous suspension containing the constituents of the hydrous magnesium silicate at least a part of the magnesium and silicon content being provided by "mesotalc" and hydrothermally treating the suspension until crystal growth occurs. The resulting crystalline product generally has rheological properties better than those of natural hectorite and may be used as a basis for organophilic derivatives.

5 Claims, No Drawings

SYNTHESIS OF HYDROUS MAGNESIUM SILICATES

This invention relates to processes for the synthesis of hydrous magnesium silicates.

The name hectorite has been ascribed to a natural trioctahedral smectite clay found at Hector, Calif., U.S.A. This clay is a hydrous magnesium silicate having the ideal composition $Si_8Mg_6O_{20}(OH)_4$ modified by having a proportion of the $Mg^{2-}$ ions and of the $OH^-$ ions replaced by $Li^+$ ions and $F^-$ ions.

Synthetic hydrous magnesium silicates having a crystal structure similar to that of natural hectorite and having better rheological properties than natural hectorite have been described in British Patents 1054111 and 1213122. The compositions of these hydrous magnesium silicates may be expressed by the followng general formula

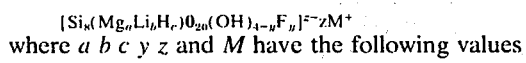

where a b c y z and M have the following values $a = >0$ to $<6$ $b = 0$ to $<6$ $c = 0$ to $<2$ $a+b+c = >4$ to $<8$ $y = 0$ to $<4$ $z = 12-2a-b-c$ $M = Na^+$ or $Li^+$ although usually, in practice, the value of 'a' will be from >4.5 to 6. Many of them are characterised by providing dispersions giving high Bingham Yield Values, which are often above 40 for example, from 50 to 250, dynes per $cm^2$ as a 2% dispersion in water. They are also suitable for conversion to organophilic clays after ion exchange reaction with certain organic cations, as described in British Pat. Nos. 1,121,501 and 1,213,122.

The term "Bingham Yield Value" (also known as Bingham Yield Stress, these terms being alternatives for the same property,) is referred to in standard works on rheology for example in "Rheology Theory and Applications" F. R. Eirich (Acad. Press) Volume 1 (1956) Page 658 and "Colloidal Dispersions" L. K. Fischer (N.Y. Bureau of Standards) Second Edition (1953) Pages 150 to 170 and "The Chemistry and Physics of Clays and other Ceramic Materials" Third Edition Page 463 A. B. Searle and R. W. Grimshaw. The Bingham Yield Value may be determined by first obtaining a flow curve relating the shear stress to the rate of shear and then extrapolating the straight line section of the curve to the shear stress axis, the intercept being the Bingham Yield Value.

The above quoted British Patents each describe a process for the production of the crystalline hydrous magnesium silicates which includes the formation of a slurry or precipitate containing the constituents of the silicates and the hydrothermal treatment of the slurry until crystal growth occurs.

British Patent No. 1,054,111 relates to the preparation of the slurry by coprecipitation by slowly combining with heating and agitation in an aqueous medium and in the presence of lithium and fluorine ions, the constituent providing the magnesium ions with constituents providing the silicon (as silicate), hydroxyl and sodium ions.

British Pat. No. 1,213,122 relates to the preparation of the precipitate by combining an aqueous solution of a water-soluble magnesium salt with an aqueous alkaline solution of one or more sodium compounds in the presence of dissolved silicon delivering material.

Thus the above quoted British Patents utilise chemicals in contrast to natural minerals and produce a hydrous magnesium silicate product having a crystal structure similar to that of natural hectorite and having a high purity. For some applications the purity of the hydrous magnesium silicate is not critical and for use in such applications it would be highly desirable to produce hydrous magnesium silicates having a crystal structure similar to that of natural hectorite and having rheological properties better than natural hectorite, utilising as a starting material a readily available naturally occurring source of silicon and magnesium. The present invention relates to a process for the preparation of a hydrous magnesium silicate having a crystal structure similar to that of natural hectorite utilising as starting material a novel intermediate which may be prepared readily from a commonly available mineral.

It has been found that the structure of talc, which has the general formula $Si_8Mg_6O_{20}(OH)_4$, when heated under controlled conditions in the presence of sodium carbonate can become modified but not completely destroyed to form a new talc-like structure which may be referred to as "meso-talc" and which is the novel intermediate referred to above. This phenomenon can be observed using X-ray diffraction techniques as hereinafter described. Some of the talc lines disappear and some are shifted slightly and new lines appear without completely destroying the overall talc-like X-ray diffraction pattern. It is thought that the modification of the talc structure is accompanied by dehydroxylation of the talc and loss of volatile matter. Therefore to avoid complete destruction of the talc structure the heating preferably should not be sufficient to remove all of the residual volatile matter in the talc.

The present invention therefore provides a new intermediate, "meso-talc" which may therefore be defined as the product obtained by heating a mixture of the talc and sodium carbonate so as to modify the talc structure while controlling the heating to avoid destroying it, as shown by x-ray diffraction data, and by the presence of some volatile matter.

Preferably the talc has a particle size of from 5 to 150 microns for example from 5 – 75 microns and a low content of impurities.

The quantity of sodium carbonate used is preferably at least 75g $Na_2CO_3$ per 100g talc and is particularly preferably in the range of 100 to 130g $Na_2CO_3$ per 100g talc. Preferably the talc is intimately mixed with powdered sodium carbonate before heating, for example, by passing the talc and sodium carbonate in a powdered state repeatedly through a coarse mesh sieve. The resulting mixture is calcined at a temperature in the range of 650°C to 900°C until "meso-talc" is produced. If calcination is continued for too long meso-talc may itself decompose into as yet unidentified products which do not possess the desirable properties of "meso-talc" itself. A useful guide as to when calcination has continued for long enough at any particular temperature is the volatile matter content of the talc/sodium carbonate mixture. The amount of sodium carbonate used, the amount of water of crystallisation in the sodium carbonate, and the amount of surface water on the talc, will control the total amount of volatile matter which may be lost from the mixture on calcination. A profile of rate of loss of this volatile matter in relation to time of heating under conditions normally used in Termogravimetric Analysis, that is when the temperature is raised at a constant rate which in the present case is suitably 4°C/minute, shows a peak during the formation of the meso-talc and a rapid fall-off when the meso-talc has been formed. The degree and duration of heating, corresponding to the point on the profile where the fall-off occurs may be determined experimentally and is a guide to the degree and duration of heating which is preferably used in carrying out the invention. Preferably the heating is controlled to retain at least 1% by weight and particularly preferably not more than about 11% by weight of residual volatile matter. When less than 130 g $Na_2CO_3$ is used per 100g of talc the preferred maximum residual volatile matter will be lower depending on the actual quantity used. The presence of "meso-talc" as identified by x-ray diffraction may also be used as an indication of the desired degree and duration of heating. Since "meso-talc" will be present after calcination in admixture with impurities comprising excess sodium carbonate and other soluble salts, it simplifies identification of the "meso-talc" by x-ray diffraction methods to wash soluble salts out of the "meso-talc" before performing the x-ray diffraction measurements.

The x-ray diffraction pattern obtained is, superficially, similar to that of talc itself with the exception that the basal reflection almost disappears and the measurement of the strong lines shows that the crystal spacings all change by significant amounts. A faint pattern of a new phase, forsterite, also appears. The following lines in the x-ray diffraction pattern do not conform to any known pattern published in the A.S.T.M. X-Ray Diffraction Index.

| | | |
|---|---|---|
| 4.26 angstroms | — | strong |
| 3.185 angstroms | — | medium weak |
| 2.60 angstroms | — | strong |
| 1.495 angstroms | — | medium strong |

On this evidence but without being limited by such a theory, it appears that "meso-talc" may be a modified form of talc. When talc is heated by itself through the same temperature range there is very small gradual loss of weight up to 800°C attributable to removal of external moisture and $CO_2$ from the small content of impurity present. Between 800°C to 900°C there is a rapid loss of weight attributable to dehydroxylation of the talc. X-ray diffraction masurements show that the structure of the talc is unchanged at 650°C and at 780°C. At 860°C, when dehydroxylation is about half completed the talc pattern is slightly altered and traces of enstatite appear. At 1000°C the X-ray diffraction pattern is that of enstatite.

Since sodium carbonate does not decompose, when heated by itself, until a temperature of about 1000°C is reached, the weight loss of the talc/sodium carbonate mixture at a temperature lower than that at which talc dehydroxylates indicates reaction between the talc and the sodium carbonate. This is accompanied by the formation of the new meso-talc phase which does not appear when talc is heated alone. When talc is heated with a small quantity, for example up to 7.5g per 100g of talc, of lithium carbonate it loses $CO_2$ and the talc dehydroxylates, as shown by a corresponding weight loss, below 800°C. X-ray diffraction measurements show the formation of enstatite and the disappearance of talc at temperatures above about 750°C and after heating to 1000°C the only products identified are enstatite and protoenstatite and there is no indication of any meso-talc being formed at any point during the heating. It is not practicable, for cost reasons, to heat talc with a large quantity of a lithium compound. A large proportion of the lithium compound could be lost during calcination.

The present invention also provides a process for the synthesis of hydrous magnesium silicates having a crystal structure similar to that of natural hectorite by forming an aqueous suspension containing "meso-talc", the suspension containing the constituents of the hydrous magnesium silicate and "meso-talc" providing at least some of the magnesium and silicon constituents of the hydrous magnesium silicate, treating the suspension hydrothermally until crystal growth occurs and separating the resulting crystalline product. Soluble salts which may be present with the "meso-talc" when it is made by the process of heating a mixture of talc and sodium carbonate are preferably not removed before the meso-talc is used in the last mentioned process. Talc itself is unsuitable for use in the synthesis of hydrous magnesium silicates having a crystal structure similar to that of natural hectorite. If talc is heated at high temperatures with lithium carbonate its structure is not radically changed although the resulting product may be used in the manufacture of such hydrous magnesium silicates. Surprisingly, however, the "meso-talc" of the present invention is extremely suitable for use in the maufacture of hydrous magnesium silicates having a crystal structure similar to that of natural hectorite.

Preferably the hydrous magnesium silicates produced in the practice of this invention have a crystal structure resembling that of natural hectorite and have the general formula:

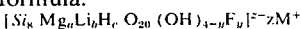

$[Si_a Mg_b Li_c H_c O_{20} (OH)_{4-y} F_y]^{z-} zM^+$

Wherein $a$, $b$, $c$, $y$, $z$, and M have the following values:

$a = >4.5$ to $<6$ $b = 0$ to $<1.5$ $c = 0$ to $<2$ $a+b+c = >4$ to $<8$ $y = $ from $0$ to $<4$ $z = -(12-2a-b-c)$ $M = Na^+$ or $Li^+$ Preferably the aqueous suspension containing the constituents of the hydrous magnesium silicate contains excess dissolved sodium or lithium compound over that required to form the cation of the hydrous magnesium silicate.

Preferably, in the above process the hydrous magnesium silicate produced contains no fluorine and, for each 8 atoms of silicon, contains from 5.0 to 5.4 atoms of magnesium and from 0 to 1.2 atoms of lithium. Preferably suitable sodium compounds provide any required alkalinity and constitute the cation M in the product.

"Meso-talc" contains silicon and magnesium atoms in an atomic ratio of 8:6. Where products containing less than 6 atoms of magnesium per 8 atoms of silicon are desired, the proportion of silicon in the aqueous suspension to be hydrothermally heated must be raised above that provided by meso-talc alone by the addition of silica. This may be achieved by the introduction of a suitable water soluble silicate into the alkaline aqueous suspension so as to precipitate silica therefrom onto the "meso-talc" which must be present in the suspension at the time of precipitation of the silica.

If only a portion of the magnesium content of the desired product is to be provided by "meso-talc" the remaining magnesium and silicon content may be provided either by coprecipitation from an alkaline medium either in the presence of the other constituents of the magnesium silicate product as is disclosed in British Pat. Nos. 1,054,111 and 1,213,122, or by precipitation of the extra silicon content onto a suspension of a suitable water insoluble magnesium compound, including the "meso-talc", in the manner described in copending British Pat. Application No. 52416/72.

A suitable water-soluble silicate is a syrupy sodium silicate solution such as one having 29% $SiO_2$ and 8.8% $Na_2O$.

Preferably the lithium and fluoride components of the synthetic magnesium silicate of the present invention are provided by coprecipitation with additional silica and extra magnesium, if required, by dissolving suitable lithium and fluorine compounds in the aqueous suspension containing meso-talc, before precipitation of the silica and magnesium, if required. Alternatively suitable lithium and/or fluorine compounds may be introduced after precipitation of the silica.

Examples of suitable lithium and fluorine compounds are lithium carbonate, sodium silicofluoride, hydrofluoric acid, lithium fluoride and lithium sulphate.

The precipitate containing the components of the desired magnesium silicate must be maintained in the wet state until after the hydrothermal treatment. Preferably the entire aqueous suspension in which the precipitate has been formed is subjected to hydrothermal treatment. The aqueous suspension subjected to hydrothermal treatment should contain excess dissolved sodium or lithium compound. In the absence of such excess a magnesium silicate having good rheological and optical properties will not be formed. The amount of the excess which is necessary for the formation of a magnesium silicate having good rheological properties will vary according to the particular magnesium silicate desired. It is not possible therefore to specify a lower limit of excess dissolved sodium or lithium compound but the amount of excess necessary for success may be determined by simple experimental tests after the particular magnesium silicate has been decided on.

Preferably the excess of sodium or lithium compound during hydrothermal treatment is at least 25% and most preferably from 50% to 200% for example 100% to 200%, over that required in theory to provide the sodium or lithium cation of the magnesium silicate.

Hydrothermal treatment may be conducted by heating in the presence of a liquid phase for from about 1 to 20 hours to crystallise the synthetic silicate. The degree of hydrothermal treatment required may vary considerably as described in British Pat. Nos. 1,054,111 and 1,213,122. It may be necessary to heat under pressure, for example, at a temperature of at least 170°C and at a pressure of at least 100 psi, while still maintaining the presence of the liquid phase, to obtain suitable crystal growth when hydrous magnesium silicates having a very low content of fluorine or containing no fluorine are being produced.

The resulting crystalline material is separated by filtration, is suitably washed, and is dried at a temperature not substantially exceeding 450°C.

The synthetic magnesium silicates resembling natural hectorite provided by the present invention may be used, as such, as swelling agents in normal applications of such agents. However, they are, alternatively suited to conversion, by ion exchange of the sodium or lithium cation with organic ammonium cations, into adducts which are suited to incorporation in organic media. In particular, where the organic ammonium cation has at least one carbon chain containing at least 18 carbon atoms, the resulting adducts are capable of forming gels after incorporation in paint media. An example of a suitable organic ammonium compound is dimethyl dioctadecyl ammonium chloride, commercially available as Arquad 2HT.

Organic adducts are also useful for the preparation of greases. The organic cation may be introduced into the synthetic magnesium silicate product of the invention at any time after hydrothermal treatment, and before or after dewatering or drying. General techniques for conducting the adduction are disclosed in British Pat. Nos. 1,121,501 and 1,213,122.

In order that the invention may be more readily understood certain embodiments of it will now be illustrated by means of the following examples. All X-ray diffraction patterns were obtained on water-washed samples.

Example 1 (Samples B and C) relates to the production of meso-talc according to the invention. Samples A and D are comparative and illustrate that "meso-talc" will not be obtained, or will be destroyed, unless the calcination conditions are suitably controlled. Examples 2–7 are according to the invention and relate to the synthesis of hydrous magnesium silicates and organic ammonium derivatives thereof using "meso-talc" as a starting material. Examples 8–13 are not according to the invention. They relate to the production of hydrous magnesium silicates and their organic ammonium derivatives from talc which has been calcined with lithium carbonate.

EXAMPLE 1

Powdered talc was intimately mixed with 122% by weight thereof of powdered sodium carbonate. The talc had the weight composition

|  |  |  |
|---|---|---|
|  | $SiO_2$ | 60.5% |
|  | MgO | 34.1% |
| Structural | $H_2O$ | 4.8% |
| Impurities |  | 0.6% |

The talc gave the X-ray diffraction pattern shown in Table 1 which corresponds closely with the standard X-ray diffraction pattern of pure talc, as published in the A.S.T.M. Index.

Table 1

| Spacing d (Å) | Relative Intensity |
|---|---|
| 9.49 | 10 |
| 8.3 | 2 |
| 4.59 | 8 |
| 3.12 | 6 |
| 2.614 | 6 |
| 2.483 | 10 |
| 2.218 | 4 |

Table 1-continued

| Spacing d (A) | Relative Intensity |
|---|---|
| 2.109 | 3 |
| 1.868 | 1 |
| 1.731 | 4 |
| 1.676 | 2d |
| 1.524 | 9 |
| 1.508 | 2 |
| 1.395 | 1d |
| 1.320 | 5 |
| 1.297 | 4 |
| 1.271 | 2 | d = diffuse

The mixture was divided into samples and the samples were gradually heated to different degrees, at a constant heating rate of 4°C temperature rise per minute. Sample A, heated to 550°C, contained unchanged talc. It lost about 5% weight on a volatile-free basis and this was attributed to loss of free water from the talc and water of crystallisation from the sodium carbonate. Sample B, was heated to 680°C. It has a residual volatile matter content of 17% and gave the X-Ray diffraction pattern, shown in columns 1 and 2 of Table 2. The interpretation of this pattern is given in columns 3, 4 and 5. In column 3 the strongest new lines which appear and which are attributable to the formation of "meso-talc" are noted. There are other weaker lines which are either new or which correspond to talc lines which appear to have shifted, which are discernable, and which are not attributable to forsterite. The 2.60 line present in talc at an intensity of 6 has grown much stronger and so is classed as a new line. The fact of its strengthening and of the disappearance of the 2.48 talc line is strong evidence that the talc structure has been modified.

Table 2

| 1 | 2 | 3 | 4 | 5 |
|---|---|---|---|---|
| d | I | "Meso Talc" | Talc Unchanged | Standard Forsterite Pattern |
| abt.15 | 1 | | | |
| 9.32 | 1 | | 9.3 | |
| 6.94 | 1 | | | |
| 5.13 | 2 | | | 5.11 |
| 4.5 | 3 | | 4.57 | |
| 4.26 | 10 | new | | |
| 3.90 | 4 | | | 3.88 |
| 3.73 | 1 | | | 3.73 |
| 3.49 | 4 | | | 3.487 |
| 3.185 | 2d | new | | |
| 3.01 | 2 | | | 3.0 |
| 2.90 | 4 | | | |
| 2.78 | 4 | | | 2.768 |
| 2.60 | 10 | new | | |
| 2.534 | 6 | | | 2.513 |
| 2.456 | 6 | | | 2.458 |
| 2.26 | 5 | | | 2.268 |
| 2.112 | 6 | | | |
| 1.959 | 1 | | | |
| 1.835 | 4 | | | |
| 1.746 | 5 | | | 1.748 |
| 1.677 | 2 | | | 1.670 |
| 1.62 | 1 | | | 1.618 |
| 1.566 | 1 | | | 1.572 |
| 1.495 | 8 | new | | |

Sample C, was heated to 780°C. It had a residual volatile matter content of only 6% by weight and gave an X-Ray diffraction pattern showing "meso-talc" lines, no forsterite lines and certain further unidentified lines. Sample D, was heated to 1000°C. It had no residual volatile matter. The X-Ray diffraction pattern showed that the "meso-talc" has almost disappeared and the unidentified phases identified in Sample C were shown as intense sharp patterns.

EXAMPLES 2 – 13

A number of examples were conducted each of which involved the manufacture of "meso-talc" and the use of the "meso-talc" produced as the sole source of magnesium in the synthesis of hydrous magnesium silicates having a structure similar to that of natural hectorite. The following conditions were used in all examples.

The talc used had the following composition by weight $SiO_2 = 61.4$, $MgO = 31.8$, $Al_2O_3 = 0.6$. It gave a loss of weight, on ignition, of 5.0% and had an estimated impurity content of less than 1%. It was almost white in colour. It had not been micronised but had been sieved through a 200 mesh BSS sieve and had a particle size of 75 microns. The talc was calcined in the presence of either sodium carbonate, (where "meso-talc" was to be produced) or lithium carbonate, under the conditions listed in the following Table. The talc was mixed with the carbonate by passing both through a coarse sieve several times. Aliquots of 100g were calcined on a silica tray in a layer approximately ½ inch deep. The calcination furnace had been preheated to the temperature to be used. After calcination the product was ground to pass a 100 mesh BSS sieve and was mixed with sodium silicate (Pyramid No. 1 grade - 29% $SiO_2$, 8.8% $Na_2O$) and with either sodium carbonate (where calcination had been conducted in the presence of lithium carbonate) or lithium carbonate (where calcination had been conducted in the presence of sodium carbonate). Enough water was added to give a product concentration of 15%. The resulting mixture was autoclaved at autogenous temperature for 5 hours at 250 p.s.i.g. to synthesise hydrous magnesium silicate. The detailed calcination conditions and synthesis conditions are given in Table 3.

The products were filtered, washed with water and ground. They were subjected to X-Ray analysis. Samples of them were dispersed in water at 2% concentration in the presence of amounts of sodium sulphate solution to give the quantity of sodium indicated in Table 4.

The products of the synthesis were also reacted with dimethyl dioctadecyl ammonium chloride, sold as Arquad 2 HT (Arquad is a Trade Name) to form an organic ammonium derivative, using either a hot technique or a cold ball-milling technique. The hot technique involved mixing a suspension of the hydrous magnesium silicate at 2% concentration with a suspension of the organic compound at 4% concentration, both suspensions having been preheated to 80° – 90°C. The mixture was heated and stirred until flocculation occurred and the solids were filtered and washed with distilled water until substantially free of soluble salts.

The cold ball-milling technique involved mixing at normal temperature both the hydrous magnesium silicate and the organic compound at high concentration, e.g. the silicate at 10% in water and the organic compound at 75% in isopropyl alcohol. The mixing was done by ball-milling in a closed system for 1 hour, followed by filtration and washing as in the case of the hot technique. The product was washed, with water, dried at 80°C and ground. The resulting product was subjected to paint flow tests as follows. A pigment dispersion was made up from the following components:

| | |
|---|---|
| TiO₂ pigment (Runa RH20 grade) | 90g |
| White Spirit | 35g |
| Ethyl alcohol | 0.8g |
| Alkyd resin, Beckosol P470 | 35g |
| Experimental product from Examples | 1.4g |

The mixture was ball-milled for 16 hours then a further 35g Beckosol P470 was added and ball-milling continued for 1 hour.

The above pigment dispersion was added to a mixture of the following ingredients:

| | |
|---|---|
| Beckosol P470 | 45g |
| Drier Solution (Pb, Co and Ca-naphthenates) | 11g |
| Methyl Ethyl Ketoxime | 0.5g |

The words RUNA and BECKOSOL are trade marks.

The total composition was further mixed for 24 hours. To test the flow properties, the paint was taken up into a 5 ml plastic syringe and small drops were dropped onto the top of a test card. The card was placed vertically and the length of flow was measured when the paint had dried.

With no additive the flow was found to be 14½ inches. The results obtained with various experimental products are tabulated in Table 5.

Table 5

Properties of organic ammonium derivatives of the hydrous magnesium silicate produced
Paint flow (inches) at given m.e. Arquad/g silicate

| Ex. No. | Hot method 0.9 | 0.7 | Cold ball-milled 0.9 | 1.1 |
|---|---|---|---|---|
| 2 | 9¼ | 11½ | 10 | |
| 3 | 10¾ | 12¼ | 10½ | 10½ |
| 4 | | 12 | 9½ | 9½ |
| 5 | 10¼ | 10½ | 9¼ | 9¼ |
| 6 | 10¾ | 11¼ | 10¼ | 9½ |
| 7 | 10¼ | 10¾ | 9 | 9¾ |
| 8 | 10¾ | 12 | 12¼ | 11½ |
| 9 | 11 | 12 | 10¾ | 11 |
| 10 | 11 | 12 | 11 | 11 |
| 11 | 11½ | 11½ | 11½ | 10¾ |
| 12 | 11¼ | 12 | 11½ | 11¼ |
| 13 | 11¼ | 12½ | 11¼ | 10½ |

What is claimed is:

1. A process for the preparation of a hydrous magnesium silicate having an X-ray diffraction pattern indicative of a hectorite structure and having the formula:

$$[Si_aMg_bLi_cH_cO_{20}(OH)_{4-y}F_y]^{z-}zM^+$$

where $a$, $b$, $c$, $y$ and $z$ have the following values:

$a = >4.5$ to $<6$ $a = 0$ to $<1.5$

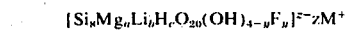

Table 3

| | Calcination of Talc | | | | | Synthesis of Hydrated Magnesium Silicate | | | | |
|---|---|---|---|---|---|---|---|---|---|---|
| | | | | | | Added to calcination product (100g) | | Atomic Ratios | | |
| Ex. No. | Added to 100g talc g | Temp. °C | Time Mins. | Wt. loss % | Resid. Volatile Matter % | Silicate g Pyr. No. 1 | Carbonate g | Mg | Li | Na |
| 2 | 122 Na₂CO₃ | 800 | 30 | 17.5 | 10.8 | 45.5 | 4.48 Li₂CO₃ | 5.1 | 0.8 | 15.7 |
| 3 | " | " | 45 | 19.0 | 9.0 | " | " | " | " | " |
| 4 | " | " | 40 | 18.8 | 9.3 | 39.8 | " | 5.2 | " | 16.0 |
| 5 | " | " | 90 | 20.7 | 7.1 | " | " | " | " | " |
| 6 | " | " | 25 | 16.7 | 11.4 | " | " | " | " | " |
| 7 | " | 890 | 60 | 25.7 | 1.0 | " | " | " | " | " |
| 8 | 4.5 Li₂CO₃ | 900 | 60 | | | " | 122 Na₂CO₃ | " | " | " |
| 9 | 6.72 | 800 | 72 | 8.7 | 0.9 | " | " | " | 1.2 | " |
| 10 | " | " | 30 | 8.2 | 1.4 | " | " | " | " | " |
| 11 | " | " | 45 | 8.2 | 1.4 | " | " | " | " | " |
| 12 | " | " | 55 | 8.23 | 1.4 | " | " | " | " | " |
| 13 | " | " | 100 | 8.8 | 0.8 | " | " | " | " | " |

$c = 0$ to $<2$ $a+b+c = >4$ to $<8$

Table 4

Properties of hydrous magnesium silicate produced
Bingham Yield Value (dynes/cm 2% concentration

| Ex. No. | X-Ray phases detected | No added Na⁺ | Na⁺ added 0.4 me/g silicate | Na⁺ added 0.8 me/g silicate |
|---|---|---|---|---|
| 2 | Hectorite | 90 | 96 | 102 |
| 3 | Hectorite | | | |
| 4 | Hectorite | | | |
| 5 | Hectorite | 120 | 168 | 240 |
| 6 | Hectorite/trace talc | 42 | 72 | 114 |
| 7 | Hectorite | 168 | 162 | 270 |
| 8 | Hectorite/trace talc | 0 | 12 | 60 |
| 9 | Hectorite/trace talc | 0 | 60 | 138 |
| 10 | Hectorite/trace talc | 0 | 60 | 90 |
| 11 | Hectorite | 0 | 48 | 114 |
| 12 | Hectorite | | | |
| 13 | Hectorite | 0 | 48 | 156 |

$Y = 0$ to $<4$ $z = 12-2a-b-c$ $M = Na+$ comprising the steps of
a. forming a mixture of talc and sodium carbonate containing from 100g to 130g of sodium carbonate per 100g of talc,
b. heating the mixture at a temperature of from 650°C to 900°C so as to modify the talc structure and produce a partial thermal degradation product thereof as shown by an alteration in the X-ray diffraction pattern of the talc,
c. controlling the heating to retain from 1% to 11% residual volatile matter in the mixture,
d. forming a suspension of the degradation product in water,
e. introducing into the suspension a water soluble silicon compound, and precipitating silica by reacting the water soluble silicon compound with one or more alkaline sodium compounds,
f. adding to the suspension lithium and fluoride ions if $y$ in the formula above is greater than 0,
g. controlling the quantity of the degradation product, the silica precipitated and the lithium and fluoride ions to give a Si:Mg:Li:F ratio within the ranges stated in the formula above,
h. maintaining the solids precipitated in the wet state,
i. treating the wet solids in the form of a suspension in water in the presence of 50% to 200% excess sodium compound over that providing the cation M in the above formula by heating it to cause crystal growth, for from 1 to 20 hours, at a pressure at least equal to atmospheric pressure while maintaining the presence of water in the liquid state, and
j. separating the resulting crystalline hydrous magnesium silicate.

2. A process as claimed in claim 1 wherein the degradation product provides the entire magnesium constituent of the hydrous magnesium silicate.

3. A process as claimed in claim 1 wherein the talc mixture is heated at a temperature within the range of from 800°C to 900°C.

4. A process as claimed in claim 1 wherein the talc has a particle size from 5 microns to 150 microns.

5. A process as claimed in claim 4 wherein the sodium carbonate has been ground to a sufficiently small size to pass a 100 BSS mesh.

* * * * *